W. B. TUCKER.
AMALGAMATING MACHINE.
APPLICATION FILED NOV. 1, 1918.
1,300,054.
Patented Apr. 8, 1919.
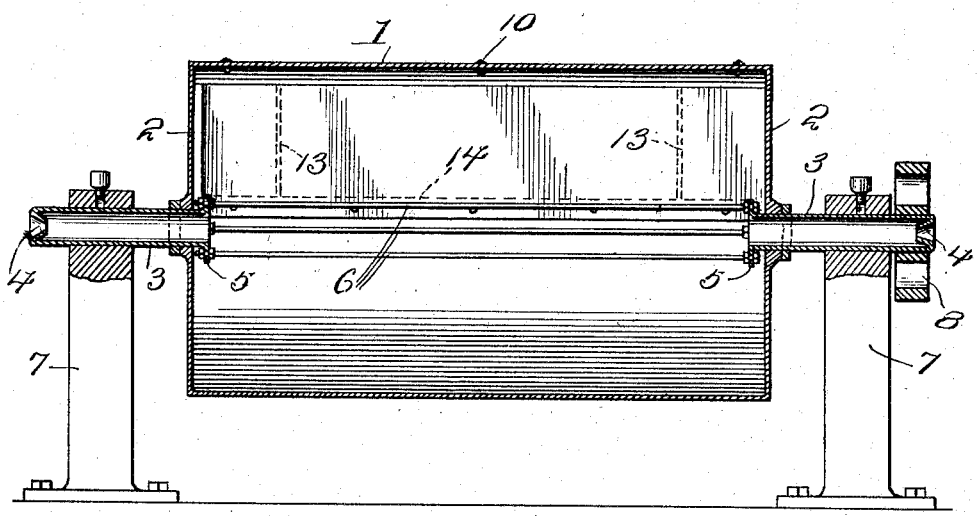
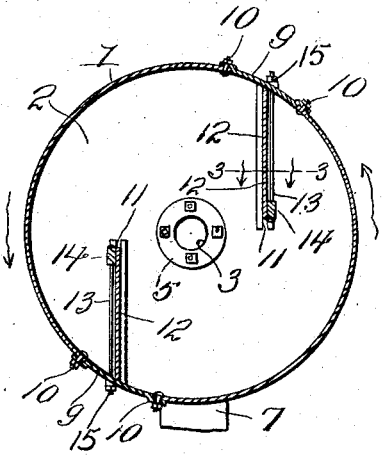
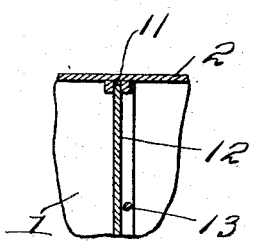
Inventor
William B. Tucker
Witness
By Victor J. Evans
Attorney

UNITED STATES PATENT OFFICE.

WILLIAM B. TUCKER, OF HEALDSBURG, CALIFORNIA.

AMALGAMATING-MACHINE.

1,300,054. Specification of Letters Patent. Patented Apr. 8, 1919.

Application filed November 1, 1918. Serial No. 260,702.

*To all whom it may concern:*

Be it known that I, WILLIAM B. TUCKER, a citizen of the United States, residing at Healdsburg, in the county of Sonoma and State of California, have invented new and useful Improvements in Amalgamating-Machines, of which the following is a specification.

This invention is an improved amalgamating machine for recovering gold and other precious metal from ore, the object of the invention being to provide an improved machine of this kind which is simple in construction, which can be readily manufactured at small cost and by means of which air and water are utilized in liberating the chemicals contained in the ore and in effecting a separation of the metal from the gangue and causing the metals to be taken up by the amalgamated plates.

With the above and other objects in view, the invention consists in the construction, combination and arrangement of devices hereinafter described and claimed.

In the accompanying drawings:

Figure 1 is a vertical longitudinal central sectional view of an amalgamating machine constructed and arranged in accordance with my invention.

Fig. 2 is a transverse sectional view of the same.

Fig. 3 is an enlarged fragmentary section on the line 3—3 of Fig. 2.

My improved amalgamating machine comprises a hollow horizontally arranged revoluble cylinder 1 which may be made of any suitable material and the heads 2 of which are provided with central openings. Tubular axle spindles 3 are secured in the centers of the heads and pass through the openings thereof and are each open at their inner and outer ends and are provided at their outer ends with inwardly turned annular flanges 4. The tubular axle spindles have outwardly extending flanges 5 at their inner ends and the said flanges are connected together by rods 6 which are arranged longitudinally of the cylinder and serve to brace and strengthen the same. The axle spindles of the cylinder are mounted in bearings in pedestals 7. One of the axle spindles is provided with a belt pulley 8 to enable the cylinder to be revolved by power from any suitable engine.

In opposite sides of the cylinder are oblong longitudinal openings and doors 9 to close said openings and which are provided with suitable clamps 10 whereby the doors may be securely fastened in place, the said clamps permitting the doors to be readily removed when desired. At points opposite the said openings the heads of the cylinder are provided in their opposing ends with grooves 11 which are arranged tangentially and which receive amalgamating plates 12. The doors enable the amalgamating plates to be removed when this is required and the amalgamating plates are secured to the doors by bolt rods 13. The bolt rods are arranged transversely of the amalgamating plates and are under the same when the amalgamating plates are in the lower side of the revolving cylinder. The inner ends of the bolt rods are secured to the stiffening strips 14 which are riveted to the amalgamating plates, the outer ends of the bolt rods passing through openings in the doors 9 and being provided with nuts 15.

The operation of my improved amalgamating machine is as follows:

Ground pulp of ores containing precious metals is placed in the cylinder and air and water is admitted to the cylinder through the hollow axle spindles and the cylinder is slowly revoluble, preferably at the rate of about eight revolutions per minute. Hence, the pulp is thoroughly agitated and all particles thereof are brought in contact with air and water and some of the pulp is carried up by one of the amalgamating plates and caused to pass inwardly thereover, during each half rotation of the cylinder. The air and water admixed with the pulp set up chemical action therein and together with the movement of the particles serve to separate the metals from the gangue, leaving the metals free to be taken up by the amalgamating plates. As each plate moves upwardly in one side of the cylinder the pulp in passing inwardly thereover drops therefrom and sucks air in through the openings formed by the tubular axle spindles so that the air is constantly renewed and the disintegrating action of the chemicals contained in the minerals is also employed, in suitable quantities, such, for instance, as soda, lime, cyanid of potassium and the nitrates. In practice, the cylinder is never filled more than about one-third full. Usually, the treatment of a charge in the cylinder requires about one hour's time to effect a recovery of all the precious metals in the ore. The inwardly turned flanges 4 prevent the pulp or water from running out of the machine if any should find its way back into the tubular spindles.

While I have herein shown and described a preferred embodiment of my invention, I would have it understood that changes may be made in the form, proportion and construction of the several parts without departing from the spirit of my invention and within the scope of the appended claims.

Having thus described my invention, I claim:

1. An amalgamating machine of the class described, comprising a hollow cylinder mounted for rotation and having air and water inlets and also provided with openings in the sides, doors to close said openings, and amalgamating plates attached to the doors and arranged in the cylinder when the doors are in place and removable from the cylinder with the doors.

2. An amalgamating machine of the class described, comprising a hollow cylinder mounted for rotation and having air and water inlets and also provided with openings in the sides, doors to close said openings, and amalgamating plates attached to the doors and arranged in the cylinder when the doors are in place and removable from the cylinder with the doors, the heads of the cylinder being provided with grooves and the ends of the amalgamating plates being slidably fitted in said grooves.

In testimony whereof I affix my signature.

WILLIAM B. TUCKER.

Copies of this patent may be obtained for five cents each, by addressing the "Commissioner of Patents, Washington, D. C."